Aug. 15, 1961
M. T. SIMNAD
2,996,444
FUEL ELEMENT CONSTRUCTION
Filed Dec. 31, 1958
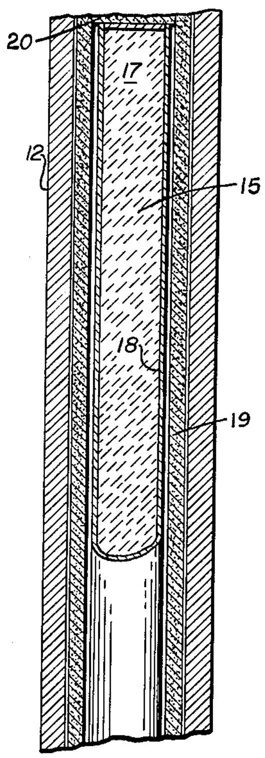
INVENTOR
MASSOUD T. SIMNAD
BY [signature]
ATTORNEY United States Patent Office 2,996,444

Patented Aug. 15, 1961

2,996,444

FUEL ELEMENT CONSTRUCTION

Massoud T. Simnad, La Jolla, Calif., assignor, by mesne assignments, to the United States of America as represented by the United States Atomic Energy Commission Filed Dec. 31, 1958, Ser. No. 784,072
3 Claims. (Cl. 204—193.2)

The present invention relates generally to the construction of fuel elements for use in nuclear reactors and, more particularly, to means for retaining volatile fission products within the fuel element.

One form of fuel element for a nuclear reactor comprises a body or compact of fissile material or a mixture of fissile and fertile materials, together with various other substances which are enclosed in one or more containers which are adapted to prevent the escape of fission products. In addition, a fission product trap which is connected to the fuel element may be provided for trapping any fission products which escape from the containers for the fuel body.

The problem of containing volatile fission products is especially serious in connection with a high temperature reactor wherein graphite or carbon is employed as the container for the fuel material. In one particularly desirable form of construction of a fuel element of this type, the body or compact of fuel is enclosed in a highly impervious graphite container which is fitted with a closure which is brazed or otherwise fastened in place to provide a substantially gas-tight seal. The graphite container enclosing the fuel body is then disposed within an outer sleeve or container of graphite, the combination of the graphite containers and the fuel body comprising the fuel element. Since the present day reactor-grade so called "impermeable graphites" have a substantial percentage of pore volume (and a large number of these pores are interconnected), they are still somewhat permeable. Thus, volatile fission products have a tendency to migrate through the inner container into the space between the sleeve and the container and thence through the sleeve into the coolant. In order to provide a less porous graphite, various techniques have been employed to decrease its permeability. For example, the surface of the graphite has been coated with a relatively impervious substance such as pyrolytic carbon which serves to fill the surface pores so as to minimize the passage of volatile materials through the graphite wall. In addition to coating or otherwise rendering the graphite more impermeable, fission product traps are employed to draw off and trap the fission products from the space between the inner and outer containers. Despite the efforts which have been made, however, the volatile fission products still have a tendency to migrate through graphite walls and contaminate the coolant.

Accordingly, it is an object of this invention to obviate or minimize the prior art problems of the migration of the volatile fission products from the fuel body and through the walls of the container. A more specific object of the invention is to provide a means for converting the volatile fission products into a stable, relatively nonvolatile form whereby they will tend to stay within a predetermined area.

Other objects and advantages of the invention will become known from reference to the following drawing and description of the invention, the drawing being a schematic fragmentary cross section of a fuel element in accordance with the present invention.

Basically, the present invention comprises a method of converting relatively volatile and/or diffusible fission products into stable, less volatile, less diffusible forms, whereby they will tend to remain, at the operating temperature of the reactor, within the desired area defined by the fuel element containers and out of contact with the coolant in the reactor core. In addition, the fission products may be physically held or adsorbed even before such conversion. These results are afforded by disposing a selected conversion material in a position where it will react with volatile and diffusible fission products. The conversion material comprises a compound which has a low thermal neutron cross section and which has a physical affinity for certain metallic fission products. The conversion material also reacts with various of the diffusible metallic fission products to convert them into molecular forms which are of lower volatility and diffusibility and which therefore have decreased tendency to migrate through the walls of the containers and out of the fuel element.

The material which accomplishes the conversion and immobilization of the volatile fission products may be disposed within the fuel body itself. For example, it may be dispersed within the fuel compacts; it may be employed as shown in the figure, as a coating on the surfaces of the fuel compacts; it may be disposed in or on the walls of the fuel containers; it may be disposed in the walls of the outer sleeve of the fuel element or as a coating on its inner surface; or it may even be disposed in the region between the fuel containers and the inner walls of the outer sleeve; or any combination of such locations. Briefly, it may be disposed within or on the fuel compacts or fuel body, in or on the fuel container or containers, or in the region between the fuel body and the fuel container of the fuel element. The conversion material may be disposed in any manner or in any position in which it will react with and immobilize volatile or diffusible fission products before they reach the coolant of the reactor system.

The conversion material which is employed, as has been pointed out, is a material having a low thermal neutron cross section. Moreover, it is an inorganic compound which is stable and has low volatility and diffusibility at the temperatures obtaining within the fuel element during operation of the reactor. The conversion material comprises a compound of magnesium and a suitable non-metallic element which is capable of reacting with the volatile fission products to be immobilized and of forming compounds therewith having lower volatility and diffusibility than the fission products to be immobilized at the temperature obtaining within the fuel element. Thus, when the metallic fission products, in the gaseous or vapor form or otherwise, migrate by diffusion or otherwise into contact with the conversion material, they react with the non-metallic element of the conversion material to produce compounds having substantially lower diffusibilities and volatilities than the respective metallic fission products so that at the operating temperature of the nuclear reactor fuel element, which may be, for example, anywhere between about 1000° C. and about 2000° C., depending on the requirements of the nuclear system, little migration of the formed compounds occurs. However, magnesium is also a product of the reaction, and may vaporize at or below the usual fuel element operating temperature. Accordingly, it is preferred that the conversion material be located within the fuel element in some position which facilitates condensing and trapping of the magnesium vapor to prevent it from entering the coolant from the fuel element. In this connection, it is preferred that the conversion material be located within or on the fuel compacts and/or within or on the inner surfaces of the containers for the compacts rather than within or on the inner surface of the outer sleeve of the fuel element.

In nuclear reactor systems radioactive fission products, particularly radioactive isotopes of the elements strontium, cesium and barium and certain other metals are troublesome because they are quite volatile and/or diffusible. These materials are extremely difficult to confine and, despite most precautions, they tend to migrate from the fuel elements at or below the operating temperature of the fuel elements. A conversion material which is especially reactive and effective with strontium, barium and cesium is magnesium fluoride, $MgF_2$. This compound yields fluorine which reacts rapidly chemically with these metals to form strontium fluoride, barium fluoride and cesium fluoride. Metallic magnesium vapor is also released during the reaction. Magnesium fluoride has a high melting point, 1396° C., a high boiling point, 2239° C., as well as low enough vapor pressure and diffusibility so that it exists in a relatively stable condition over an extended period of time in nuclear fuel elements operating at the usual temperatures.

Of particular importance is the fact that magnesium fluoride has an unusual affinity and acts as a slagging agent for alkali metals, including cesium, and alkaline earth metals, including barium and strontium. Such metals are adsorbed or taken up in solid solution by the magnesium fluoride, with the metals wedged in the crystal structure thereof.

Accordingly, both a physical reaction and a chemical reaction occur when magnesium fluoride is contacted with strontium, barium and cesium. The magnesium fluoride acts to adsorb or take up these migrating metals, and also chemically reacts therewith to form relatively stable strontium fluoride, barium fluoride and cesium fluoride. These two types of actions cooperate to afford effective prevention or inhibition of migration of the volatilizable diffusing fission products and thereby prevent contamination of the reactor coolant.

One particularly efficient manner of utilizing the conversion material is to disperse it as a coating on the outer surface of the fuel body or compact, or as a coating in the interior of the fuel container. In a fuel compact containing about 35 grams of uranium-235 and about 180 grams of thorium, between about 10 and 50 grams of magnesium fluoride is sufficient to combine with volatile fission products, particularly barium, strontium and cesium, produced over a three-year burn-up period. If the magnesium fluoride is dispersed within the fuel compacts and/or within carbon structural members such as graphite containers for the fuel compacts, care should be taken so that the strength of the fuel compacts or carbon members is not substantially weakened and that the density thereof is not lowered sufficiently to cause difficulties.

In the accompanying schematic drawing, a portion of a solid fuel element 17 in accordance with the present invention is illustrated, which fuel element has a typical general form of construction. The fuel element includes a solid fuel body or compact 15, which may comprise a mixture of fissile and fertile materials, on the outer surface of which compact is disposed a coating 18 of conversion material, i.e., magnesium fluoride. The fuel body is enclosed in a highly impervious graphite container 19 fitted with a top closure 20 brazed in place to provide a substantially gas-tight seal. The graphite container enclosing the fuel body is disposed within an outer sleeve or container 12 of graphite.

The provision of the conversion material in the fuel element construction materially reduces the amount of volatile and diffusible fission products which escape from the fuel element and thus minimizes the danger of contamination of the reactor coolant from the fission products and substantially eliminates the problem of fission product removal from the reactor coolant.

It will be obvious that the conversion material may be combined, if desired, with other trapping agents or the like to enhance or facilitate the retention of the fission products within the fuel element.

Modifications in the fuel element of the present invention, in the conversion material therefor, and in the method of preparing and utilizing the same as are within the skill of those versed in the art are contemplated as being within the scope of the present invention.

Various features of the invention which are believed to be new are set forth in the appended claims.

I claim:

1. A solid fuel element for a nuclear reactor including a solid fuel body, a solid container unit disposed about said fuel body to isolate said fuel body from coolant in the reactor, said container unit comprising at least one container, and a conversion material solid at the reactor operating temperature and of low thermal neutron cross section disposed inwardly of the outermost surface of said container unit, said conversion material consisting of magnesium fluoride, whereby metallic fission products migrating from said fuel body to said coolant are absorbed in solid solution by and react with said conversion material to produce compounds having lower volatility and diffusibility than said metallic fission products.

2. A solid fuel element for a nuclear reactor including a solid fuel body, a solid container unit disposed about said fuel body to isolate said fuel body from coolant in the reactor, said container unit comprising at least one container, a conversion material solid at the reactor operating temperature and of low thermal neutron cross section disposed inwardly of the outermost surface of said container unit, said conversion material being magnesium fluoride, whereby strontium, barium and cesium fission products are physically attached to and adsorbed by said magnesium fluoride and metallic fission products react with said magnesium fluoride to form fluorides having decreased volatility and diffusibility in contrast to the respective fission products, fission product migration from the fuel element thereby being reduced.

3. A solid fuel element for a nuclear reactor including a solid fuel body comprising a mixture of fissile and fertile materials, an inner graphite container disposed about said fuel body and an outer graphite container disposed around said inner container to isolate said fuel body and inner container from reactor coolant, a conversion material solid at the reactor operating temperature and of low thermal neutron cross section disposed inwardly of the outermost surface of said inner container, said conversion material consisting of a coating of magnesium difluoride, whereby strontium, barium and cesium fission products are adsorbed by said magnesium difluoride and metallic fission products react with said magnesium difluoride to form fluorides having decreased volatility and diffusibility, in contrast to the respective fission products, fission product migration from the fuel element thereby being substantially reduced.

References Cited in the file of this patent

UNITED STATES PATENTS

| | | |
|---|---|---|
| 2,758,023 | Bareis | Aug. 7, 1956 |
| 2,816,042 | Hamilton | Dec. 10, 1957 |
| 2,818,605 | Miller | Jan. 7, 1958 |
| 2,852,460 | Abbott et al. | Sept. 16, 1958 |
| 2,853,446 | Abbott et al. | Sept. 23, 1958 |

FOREIGN PATENTS

| | | |
|---|---|---|
| 754,559 | Great Britain | Aug. 8, 1956 |

OTHER REFERENCES

Nucleonics, March 1956, pp. 34–41.

NAA-SR-2047, Oct. 1, 1957.